US010791185B2

(12) United States Patent
Luo et al.

(10) Patent No.: US 10,791,185 B2
(45) Date of Patent: Sep. 29, 2020

(54) METHOD AND APPARATUS FOR CONNECTING AUTOMATIC DIALOGUE TOOL TO THIRD PARTY

(71) Applicant: Tencent Technology (Shenzhen) Company Limited, Shenzhen, Guangdong (CN)

(72) Inventors: Jinglin Luo, Guangdong (CN); Jing Liao, Guangdong (CN); Tianqi Xu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 160 days.

(21) Appl. No.: 15/210,442

(22) Filed: Jul. 14, 2016

(65) Prior Publication Data

US 2016/0323394 A1 Nov. 3, 2016

Related U.S. Application Data

(63) Continuation of application No. PCT/CN2015/070827, filed on Jan. 16, 2015.

(30) Foreign Application Priority Data

Jan. 20, 2014 (CN) .......................... 2014 1 0026028

(51) Int. Cl.
*H04L 29/08* (2006.01)
*G06F 16/25* (2019.01)
(Continued)

(52) U.S. Cl.
CPC .......... *H04L 67/20* (2013.01); *G06F 16/2455* (2019.01); *G06F 16/252* (2019.01);
(Continued)

(58) Field of Classification Search
CPC ......... H04L 67/20; H04L 67/42; H04L 51/02; G06F 16/252; G06F 16/2455; G06F 16/90332
(Continued)

(56) References Cited

U.S. PATENT DOCUMENTS 7,603,413 B1   10/2009  Montet et al.
7,702,537 B2 *  4/2010  Meisel .............. G06F 17/30864
                                                                      705/14.51
(Continued)

FOREIGN PATENT DOCUMENTS

CN        101076060 A     11/2007
CN        101374120 A     2/2009
WO   WO 2015/106707 A1   7/2015

OTHER PUBLICATIONS

International Search Report and Written Opinion received in PCT Application No. PCT/CN2015/070827 dated May 4, 2015.
(Continued)

*Primary Examiner* — Umar Cheema
*Assistant Examiner* — Tony Williams
(74) *Attorney, Agent, or Firm* — Brinks Gilson & Lione

(57) ABSTRACT

A method for connecting an automatic dialogue tool to a third party includes: receiving information content sent by a user client and extracting key information from the information content; querying, according to the key information, for third party information corresponding to the key information, and sending the third party information to the user client; receiving third party information selected by the user client and sending an access request to a third party client selected by the user client; and establishing a communication connection between the user client and the third party client after receiving an access response fed back by the third party client.

17 Claims, 6 Drawing Sheets

(51) Int. Cl.
  *G06F 16/2455* (2019.01)
  *G06F 16/9032* (2019.01)
  *H04L 29/06* (2006.01)
  *H04L 12/58* (2006.01)
(52) U.S. Cl.
  CPC ........ *G06F 16/90332* (2019.01); *H04L 51/02* (2013.01); *H04L 67/42* (2013.01)
(58) Field of Classification Search
  USPC .......................................................... 709/203
  See application file for complete search history.

(56) References Cited

U.S. PATENT DOCUMENTS

| | | | |
|---|---|---|---|
| 2003/0220972 A1 | 11/2003 | Dalmasso et al. | |
| 2006/0150119 A1* | 7/2006 | Chesnais | G06F 16/243 715/810 |
| 2007/0156677 A1* | 7/2007 | Szabo | G06F 17/30522 |
| 2008/0306883 A1* | 12/2008 | Baffier | G06F 8/61 705/400 |
| 2009/0055485 A1 | 2/2009 | Tsai et al. | |
| 2010/0023582 A1* | 1/2010 | Pedersen | H04L 63/0272 709/203 |
| 2011/0113094 A1* | 5/2011 | Chunilal | G06F 17/30867 709/204 |
| 2011/0208838 A1* | 8/2011 | Thomas | H04L 29/06 709/219 |
| 2013/0132512 A1* | 5/2013 | Klug | G06F 17/30867 709/217 |
| 2013/0275164 A1* | 10/2013 | Gruber | G10L 17/22 705/5 |
| 2013/0290702 A1* | 10/2013 | Wang | H04W 12/08 713/155 |
| 2014/0006129 A1* | 1/2014 | Heath | G06Q 30/0222 705/14.23 |

OTHER PUBLICATIONS

Office Action dated Jun. 4, 2019 for Chinese Application No. 201410026028.2 with concise English Translation, 6 pages.

* cited by examiner

METHOD AND APPARATUS FOR CONNECTING AUTOMATIC DIALOGUE TOOL TO THIRD PARTY

CROSS-REFERENCE TO RELATED APPLICATIONS

This application is a continuation of International Application No. PCT/CN2015/070827, filed on Jan. 16, 2015, which claims priority to Chinese Patent Application No. 201410026028.2, filed on Jan. 20, 2014, both of which are hereby incorporated by reference in their entireties.

TECHNICAL FIELD

The present disclosure relates to the field of network technologies, and in particular, to a method and an apparatus for connecting an automatic dialogue tool to a third party.

BACKGROUND

With the development of the Internet and intelligent terminals, various types of chat software also become increasingly popular. In some chat software, a dialogue with an automatic dialogue tool, for example, a chat robot, can also be made in addition to a conventional chat with a friend at a peer end. The automatic dialogue tool is a chatting tool that replies automatically, provides one answer for one question, and may retrieve a closest answer from a database according to a question of a user, reply to the user, and give an answer to some frequently asked questions. However, current automatic dialogue tools are majorly used in dialogues for a pastime, and for some problems that need to be solved by a third party, the automatic dialogue tools can only provide coarse answers and cannot directly solve the problems. In this case, a user still needs to contact the third party. For example, when a user says "I want to buy a bottle of cold medicine", most automatic dialogue tools do not know what it means, and any one of the current automatic dialogue tools does not help the user to directly contact a merchant that sells medicine and cannot help the user to contact a common merchant when the user asks a question.

SUMMARY

Embodiments of the present disclosure provide a method and an apparatus for connecting an automatic dialogue tool to a third party, which can directly forward a question that the automatic dialogue tool cannot answer to a corresponding third party for answering.

An embodiment of the present disclosure provides a method for connecting an automatic dialogue tool to a third party, including the following steps:

receiving information content sent by a user client and extracting key information from the information content;

querying, according to the key information, for third party information corresponding to the key information, and sending the third party information to the user client;

receiving third party information selected by the user client and sending an access request to a third party client selected by the user client; and establishing a communication connection between the user client and the third party client after receiving an access response fed back by the third party client.

An embodiment of the present disclosure further provides an apparatus for connecting an automatic dialogue tool to a third party, including:

a transceiver module, configured to receive information content sent by a user client;

an extracting module, configured to extract key information from the information content;

a querying module, configured to query, according to the key information, for third party information corresponding to the key information, where the transceiver module is further configured to send the third party information to the user client, receive third party information selected by the user client, and send an access request to a third party client selected by the user client; and a connecting module, configured to establish a communication connection between the user client and the third party client after receiving an access response fed back by the third party client.

According to the embodiments of the present disclosure, chat content is analyzed, third party information associated with the consulted content is provided for a user, and a communication connection is established between the user and a third party according to a selection of the user, so that the third party directly makes a dialogue with the user, which, on one hand, shortens a time for searching for the third party by the user, improves consultation efficiency of the user, and provides convenience to the user, and on the other hand, also brings a great number of customers to the third party and reduces a time and costs for looking for customers by the third party.

The implementation of the objectives, the functional features, and the advantages of the present disclosure are further described with reference to the embodiments and the accompanying drawings.

DESCRIPTION OF EMBODIMENTS

It should be understood that the specific embodiments described herein are merely intended to explain the present disclosure and are not intended to limit the present disclosure.

Figure 1:
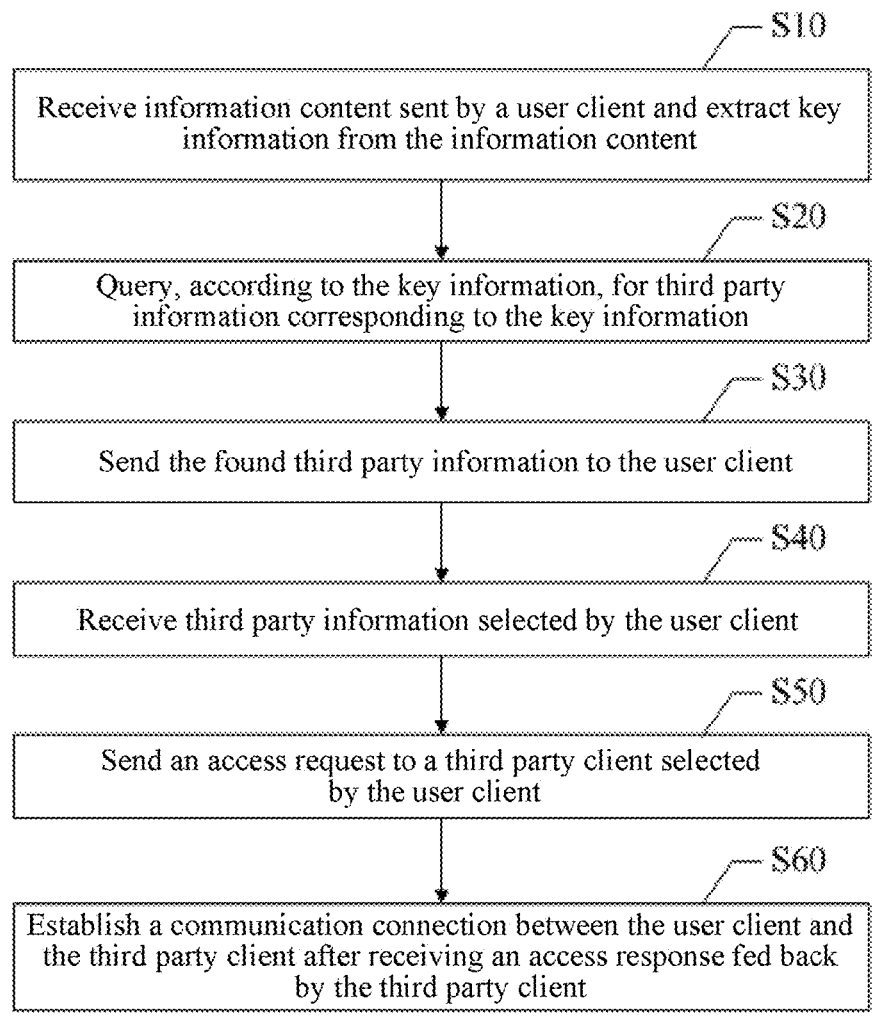
FIG. 1 is a flowchart of a first embodiment of a method for connecting an automatic dialogue tool to a third party according to the present disclosure.

As shown in FIG. 1, FIG. 1 is a flowchart of a first embodiment of a method for connecting an automatic dialogue tool to a third party according to the present disclosure. The method for connecting an automatic dialogue tool to a third party provided in this embodiment includes the following steps:

Step S10: Receive information content sent by a user client and extract key information from the information content.

Figure 8:
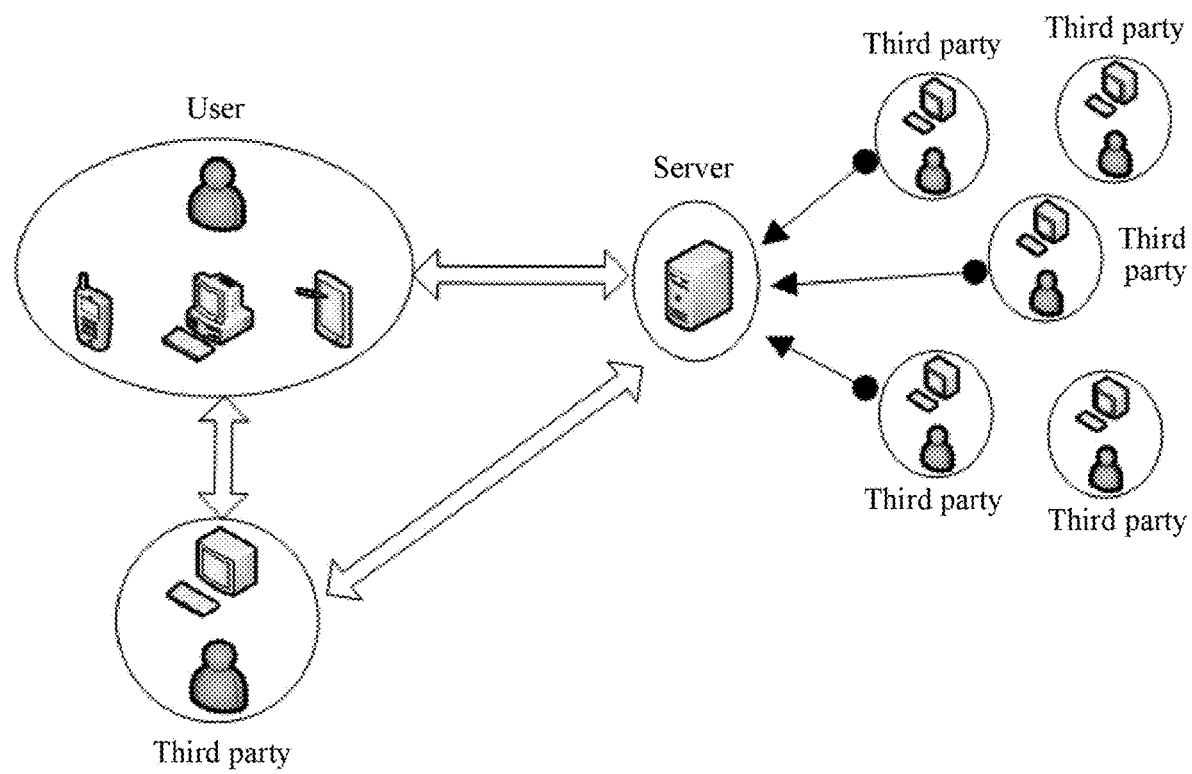
FIG. 8 is a schematic diagram of interactions among a user client, a server, and a third party client according to an embodiment of the present disclosure.

A software environment in this embodiment may be in chat software capable of making a dialogue automatically, for example, a chat robot. Reference may also be made to FIG. 8. A hardware running environment in this embodiment may include a backend server, where an account of an automatic dialogue tool is set on the backend server, and the account of the automatic dialogue tool is used as a dialogue interface to make a dialogue with a user account; the hardware running environment may also include a user client installed on an intelligent terminal such as a mobile phone, a PAD, a notebook computer, a desktop computer, or an all-in-one machine, which may be used by a user that has a consultation demand, and the user logs in by using the user client and may contact the account of the automatic dialogue tool to make a dialogue with the automatic dialogue tool, or may contact another user account to make a dialogue with another user; and the hardware running environment may also include a third party client, where the third party client may be a client installed on an intelligent terminal such as a mobile phone, a PAD, a notebook computer, a desktop computer, or an all-in-one machine, which may be used by a third party for solving a problem or providing a service for a user, and the third party logs in by using the third party client and may contact the account of the automatic dialogue tool to make a dialogue with the automatic dialogue tool, or may contact another user account to make a dialogue with another user.

When making a dialogue with the automatic dialogue tool by using the user client, a user enters information content in a dialog box. A terminal used by the user sends dialogue information content to the server through a network. After receiving the dialogue information content, the server extracts key information from the dialogue information content. For example, a user sends "I want to buy cold medicine" and the server extracts "buy cold medicine" as key information from the dialogue. Certainly, if dialogue content sent by the user is not content to be consulted, but simply is only a chat for a pastime, for example, "How are you", the automatic dialogue tool only needs to reply set corresponding content; or if the dialogue content is a question that can be answered without participation of a third party, for example, "What's the weather like today", the automatic dialogue tool directly pulls the weather of the day from a weather server or an Internet website and displays the weather of the day in the dialog box.

Step S20: Query, according to the key information, for third party information corresponding to the key information.

The server queries for third party information according to the key information. For example, for the key information "buy cold medicine", on one hand, the automatic dialogue tool may search for brands of cold medicine from websites and display the brands in the dialog box, and on the other hand, the server may search for a merchant of cold medicine that can have a chat and make a dialogue by using a client, and obtain information about the merchant. In addition, the server may also search for some physicians that can have a chat and make a dialogue by using a client, and obtain information about the physicians by using them as third parties.

Step S30: Send the third party information to the user client.

The server sends a found brief introduction and related link of a third party to the user account by using the account of the automatic dialogue tool and displays the found brief introduction and related link of the third party in the dialog box of the user client for reference for the user.

Step S40: Receive third party information selected by the user client.

After viewing information recommended by the server, the user may click to select needed third party information. The user client returns third party information selected by the user to the server.

Step S50: Send an access request to a third party client selected by the user client.

The server sends, according to the selection of the user, an access request to a corresponding third party account and waits for confirmation of a third party.

Step S60: Establish a communication connection between the user client and the third party client after receiving an access response fed back by the third party client.

After receiving the access request sent from the server, if the third party agrees with the access, the third party clicks to confirm and returns a confirmation information back to the server. After receiving confirmation information of the third party, the server directly connects the third party account to the user account, and the third party can directly make a dialogue with the user, answer a question of the user, and provide a service for the user.

According to this embodiment, chat content is analyzed, third party information associated with the consulted content is provided for a user, and a communication connection is established between the user and a third party according to a selection of the user, so that the third party directly makes a dialogue with the user, which, on one hand, shortens a time for searching for the third party by the user, improves consultation efficiency of the user, and provides convenience to the user, and on the other hand, also brings a great number of customers to the third party and reduces a time and costs for looking for customers by the third party.

Figure 2:
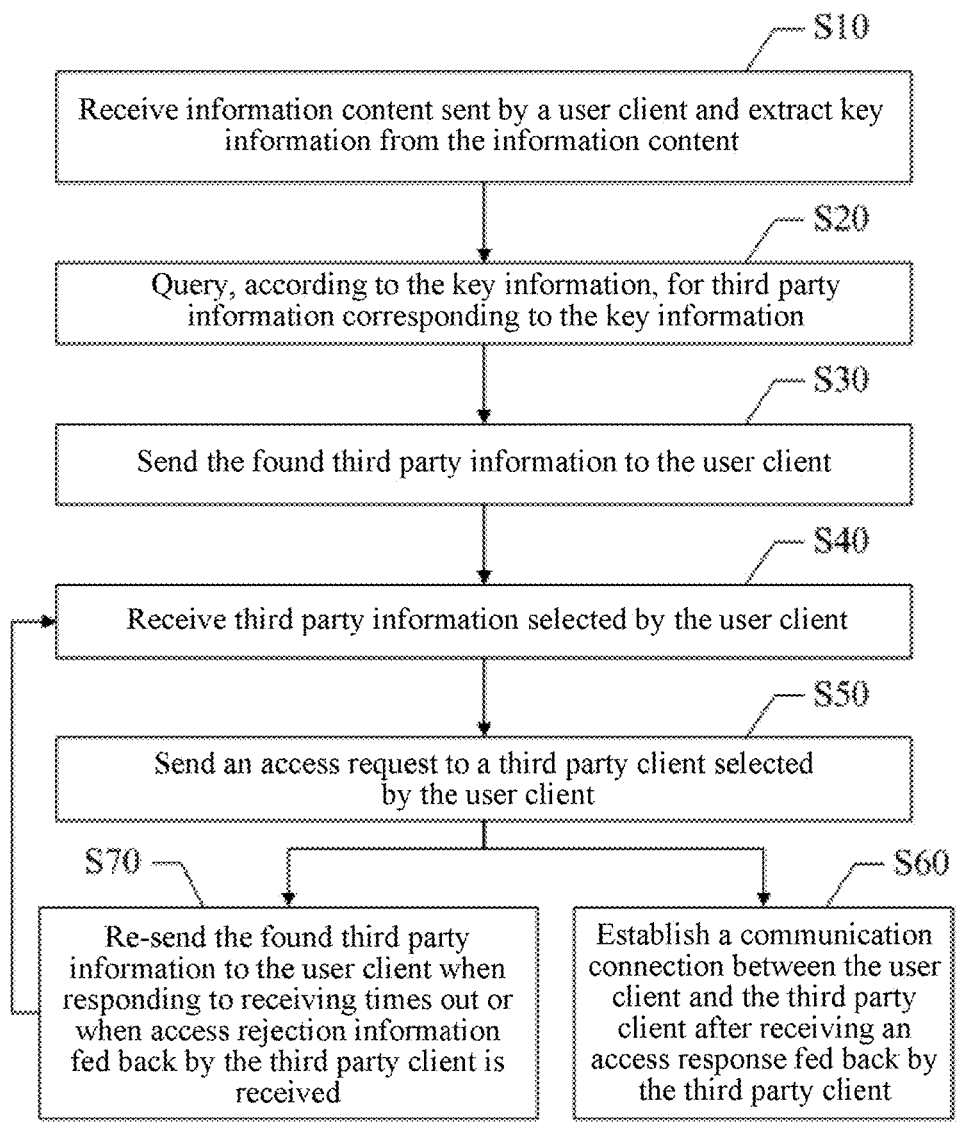
FIG. 2 is a flowchart of a second embodiment of a method for connecting an automatic dialogue tool to a third party according to the present disclosure.

As shown in FIG. 2, FIG. 2 is a flowchart of a second embodiment of a method for connecting an automatic dialogue tool to a third party according to the present disclosure. This embodiment is based on the embodiment shown in FIG. 1, and after step S50, further includes:

Step S70: Re-send the third party information to the user client when responding to receiving times out or when access rejection information fed back by the third party client is received.

In this embodiment, in consideration of that the third party cannot reply in time in some cases, for example, a network is blocked, the third party does not log in, or the third party is not at the terminal after login, the server still does not receive the confirmation information sent from the third party client after waiting for a period of time, or the third party rejects the access due to other reasons and the server receives rejection information sent from the third party client; in this case, the server re-sends the third party information to the user and informs the user that the connection times out or the opposite party rejects the access, and the user may reselect a third party for a reconnection. According to this embodiment, optional third party information is re-provided for a user in time when a third party does not reply or rejects access, which prevents the user from waiting for an excessively long time, further facilitates improvement of consultation efficiency of the user, and shortens a time for searching for the third party by the user.

Figure 3:
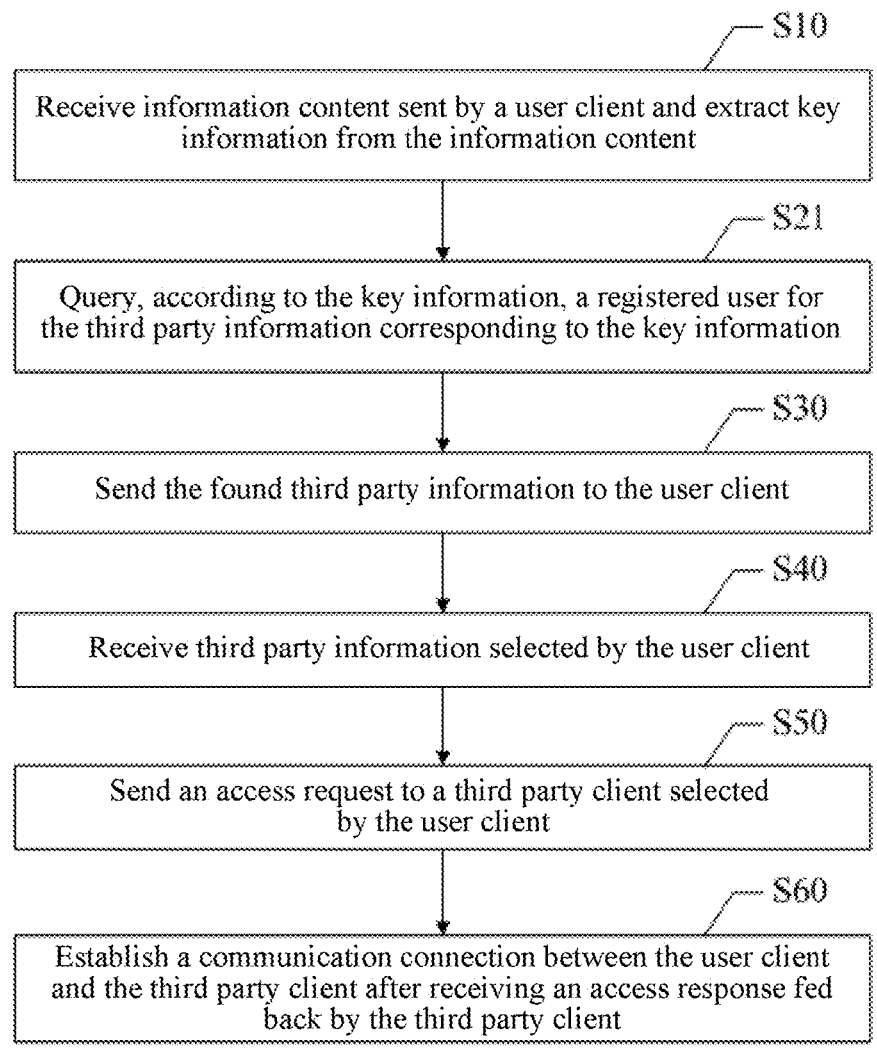
FIG. 3 is a flowchart of a third embodiment of a method for connecting an automatic dialogue tool to a third party according to the present disclosure.

As shown in FIG. 3, FIG. 3 is a flowchart of a third embodiment of a method for connecting an automatic dialogue tool to a third party according to the present disclosure. This embodiment is based on the embodiment shown in FIG. 1, and step S20 includes:

Step S21: Query, according to the key information, a registered user for the third party information corresponding to the key information.

In this embodiment, when querying for third party information, the server may traverse all registered user accounts, search, according to information such as, a name, a brief introduction, and a category provided by the user, the registered user accounts for a user corresponding to the key information, and use the user as a third party for sending to the user client. In addition, the server may also only search an account that is logged in to, for a third party to ensure that the third party provided for the user logs in, so as to prevent a case in which the third party is offline and cannot answer a question or provide a service for the user in time. According to this embodiment, registered users are traversed to search for a third party, so that third party information provided for a user is more complete, which saves a time for searching for a third party by the user, and improves consultation efficiency of the user.

Figure 4:
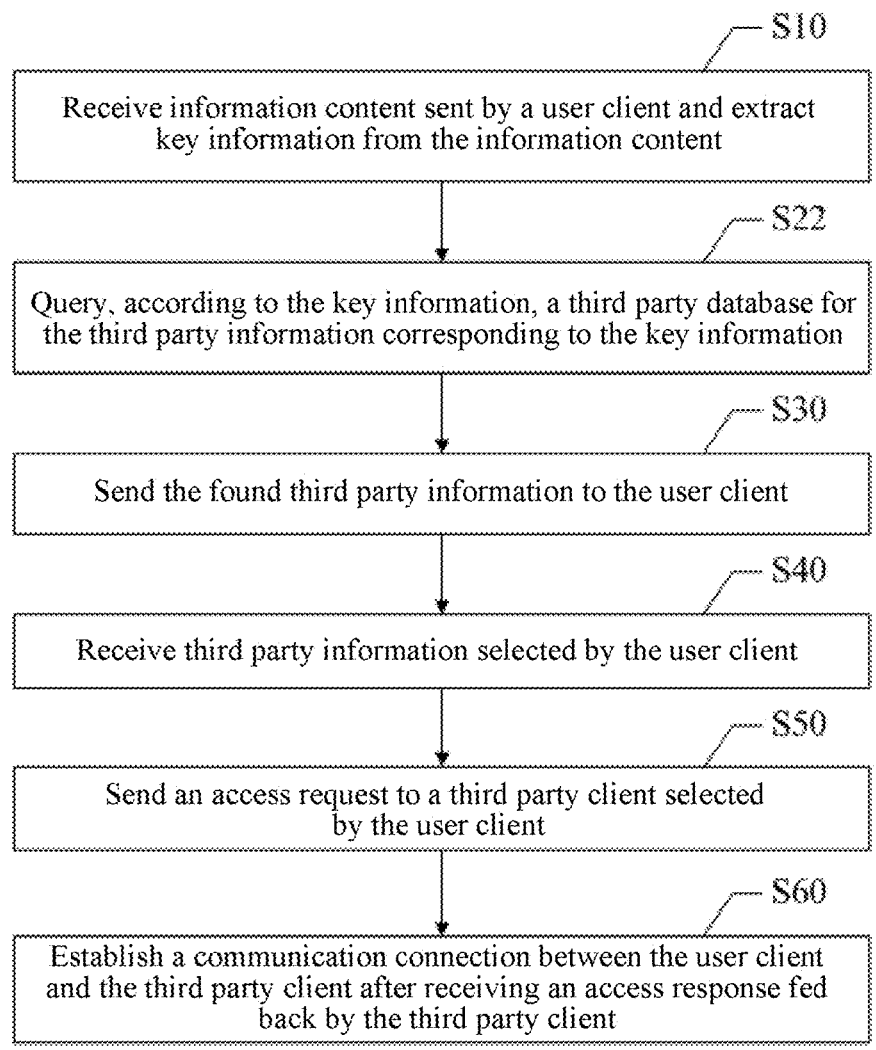
FIG. 4 is a flowchart of a fourth embodiment of a method for connecting an automatic dialogue tool to a third party according to the present disclosure.

As shown in FIG. 4, FIG. 4 is a flowchart of a fourth embodiment of a method for connecting an automatic dialogue tool to a third party according to the present disclosure. This embodiment is based on the embodiment shown in FIG. 1, and step S20 includes:

Step S22: Query, according to the key information, a third party database for the third party information corresponding to the key information.

In this embodiment, when querying for third party information, the server performs searching by using a special third party database. The database records information about all registered third parties. The server does not need to traverse all registered accounts after extracting the key information, because not all the users are third parties. The server only needs to perform searching in the range of the third party database. All users entered in the third party database are third parties, so that shortening of a time for searching for a third party by the server is facilitated, and the efficiency of connecting a third party is further improved. In addition, the third party database may also store third party information in different categories, for example, a medicine category, a daily commodity category, an electric product category, and a clothing category. When receiving the dialogue information of "I want to buy cold medicine", the server only needs to search the medicine category for a third party, so that a time for searching for a third party is further shortened, and the efficiency of connecting the third party is further improved.

Figure 5:
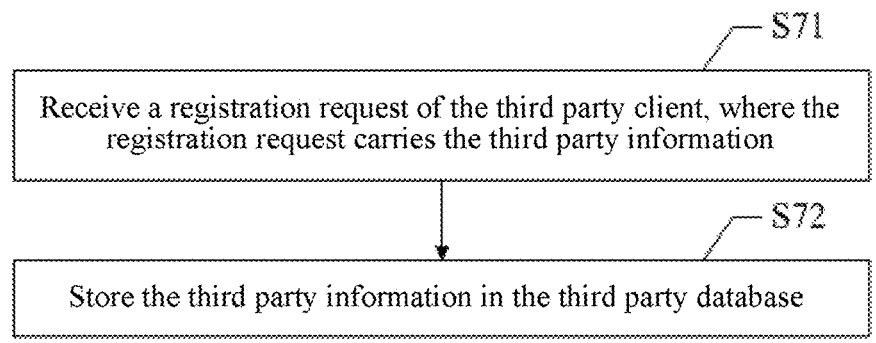
FIG. 5 is a flowchart of steps of creating a third party database in the fourth embodiment of the method for connecting an automatic dialogue tool to a third party according to the present disclosure.

As shown in FIG. 5, FIG. 5 is a flowchart of steps of creating a third party database in the fourth embodiment of the method for connecting an automatic dialogue tool to a third party according to the present disclosure, which includes the following steps:

Step S71: Receive a registration request of the third party client, where the registration request carries the third party information.

Step S72: Store the third party information in the third party database.

In this embodiment, when the third party database is created, a third party is allowed to register by using a client and submit information related to the third party during the registration, so as to prove that it is a third party. For example, a name, an involved range, and the like of the third party are clarified in an account name and a brief introduction, so as to be stored in the database by the server. In addition, the third party may also select a list to which the third party belongs, so as to be classified into a corresponding category in the database for subsequent searching. In addition, the server may also require the third party to upload related qualification documents, for example, an identity card, a business license, and a qualification license, so as to prevent some lawbreakers from entering the database in chaos to damage interests of the user, and ensure consultation safety and reliability of the user.

Figure 6:
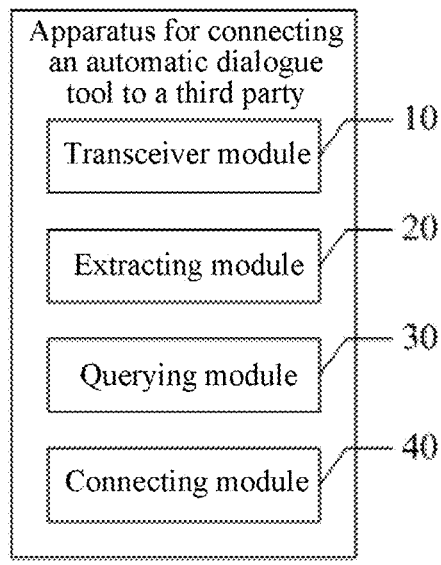
FIG. 6 is a schematic structural diagram of a first embodiment of an apparatus for connecting an automatic dialogue tool to a third party according to the present disclosure.

As shown in FIG. 6, FIG. 6 is a schematic structural diagram of a first embodiment of an apparatus for connecting an automatic dialogue tool to a third party according to the present disclosure. The apparatus for connecting an automatic dialogue tool to a third party provided in this embodiment includes:

a transceiver module 10, configured to receive information content sent by a user client;

an extracting module 20, configured to extract key information from the information content;

a querying module 30, configured to query, according to the key information, for third party information corresponding to the key information, where the transceiver module 10 is further configured to send the third party information to the user client, receive third party information selected by the user client, and send an access request to a third party client selected by the user client; and a connecting module 40, configured to establish a communication connection between the user client and the third party client after receiving an access response fed back by the third party client.

A software environment in this embodiment may be in chat software capable of making a dialogue automatically, for example, a chat robot. Reference may also be made to FIG. 8. A hardware running environment in this embodiment may include a backend server, where an account of an automatic dialogue tool is set on the backend server, and the account of the automatic dialogue tool is used as a dialogue interface to make a dialogue with a user account; the hardware running environment may also include a user client installed on an intelligent terminal such as a mobile phone, a PAD, a notebook computer, a desktop computer, or an all-in-one machine, which may be used by a user that has a consultation demand, and the user logs in by using the user client and may contact the account of the automatic dialogue tool to make a dialogue with the automatic dialogue tool, or may contact another user account to make a dialogue with another user; and the hardware running environment may also include a third party client, where the third party client may be a client installed on an intelligent terminal such as a mobile phone, a PAD, a notebook computer, a desktop computer, or an all-in-one machine, which may be used by a third party for solving a problem or providing a service for a user, and the third party logs in by using the third party client and may contact the account of the automatic dialogue tool to make a dialogue with the automatic dialogue tool, or may contact another user account to make a dialogue with another user.

When making a dialogue with the automatic dialogue tool by using the user client, a user enters information content in a dialog box. A terminal used by the user sends dialogue information content to the server through a network. After receiving the dialogue information content, the server extracts key information from the dialogue information content. For example, a user sends "I want to buy cold medicine" and the server extracts "buy cold medicine" as key information from the dialogue. Certainly, if dialogue content sent by the user is not content to be consulted, but simply is only a chat for a pastime, for example, "How are you", the automatic dialogue tool only needs to reply set corresponding content; or if the dialogue content is a question that can be answered without participation of a third party, for example, "What's the weather like today", the automatic dialogue tool directly pulls the weather of the day from a weather server or an Internet website and displays the weather of the day in the dialog box.

The server queries for third party information according to the key information. For example, for the key information "buy cold medicine", on one hand, the automatic dialogue tool may search for brands of cold medicine from websites and display the found brands in the dialog box, and on the other hand, the server may search for a merchant of cold medicine that can have a chat and make a dialogue by using a client, and obtain information about the merchant. In addition, the server may also search for some physicians that can have a chat and make a dialogue by using a client, and obtain information about the physicians by using them as third parties.

The server sends a found brief introduction and related link of a third party to the user account by using the account of the automatic dialogue tool and displays the found brief introduction and related link of the third party in the dialog box of the user client for reference for the user. After viewing information recommended by the server, the user may click to select needed third party information. The user client returns the selection of the user to the server. The server sends, according to the selection of the user, an access request to a corresponding third party account and waits for confirmation of the third party. After receiving the access request sent from the server, if the third party agrees with the access, the third party clicks to confirm and returns it back to the server. After receiving confirmation information of the third party, the server directly connects the third party account to the user account, and the third party can directly make a dialogue with the user, answer a question of the user, and provide a service for the user.

According to this embodiment, chat content is analyzed, third party information associated with the consulted content is provided for a user, and a communication connection is established between the user and a third party according to a selection of the user, so that the third party directly makes a dialogue with the user, which, on one hand, shortens a time for searching for the third party by the user, improves consultation efficiency of the user, and provides convenience to the user, and on the other hand, also brings a great number of customers to the third party and reduces a time and costs for looking for customers by the third party.

Further, the transceiver module 10 is further configured to re-send the third party information to the user client when responding to receiving times out or when access rejection information fed back by the third party client is received.

In this embodiment, in consideration of that the third party cannot reply in time in some cases, for example, a network is blocked, the third party does not log in, or the third party is not at the terminal after login, the server still does not receive the confirmation information sent from the third party client after waiting for a period of time, or the third party rejects the access due to other reasons and the server receives rejection information sent from the third party client; in this case, the server re-sends the third party information to the user and informs the user that the connection times out or the opposite party rejects the access, and the user may reselect a third party for a reconnection. According to this embodiment, optional third party information is re-provided for a user in time when a third party does not reply or rejects access, which prevents the user from waiting for an excessively long time, further facilitates improvement of consultation efficiency of the user, and shortens a time for searching for the third party by the user.

Further, the querying module 30 is further configured to query, according to the key information, a registered user for the third party information corresponding to the key information.

In this embodiment, when querying for third party information, the server may traverse all registered user accounts, search, according to information such as, a name, a brief introduction, and a category provided by the user, the registered user accounts for a user corresponding to the key information, and use the user as a third party for sending to the user client.

In addition, the server may also only search an account that is logged in to, for a third party to ensure that the third party provided for the user logs in, so as to prevent a case in which the third party is offline and cannot answer a question or provide a service for the user in time. According to this embodiment, registered users are traversed to search for a third party, so that third party information provided for a user is more complete, which saves a time for searching for a third party by the user, and improves consultation efficiency of the user.

Further, the querying module 30 is further configured to query, according to the key information, a third party database for the third party information corresponding to the key information.

In this embodiment, when querying for third party information, the server performs searching by using a special third party database. The database records information about all registered third parties. The server does not need to traverse all registered accounts after extracting the key information, because not all the users are third parties. The server only needs to perform searching in the range of the third party database. All users entered in the third party database are third parties, so that shortening of a time for searching for a third party by the server is facilitated, and the efficiency of connecting a third party is further improved. In addition, the third party database may also store third party information in different categories, for example, a medicine category, a daily commodity category, an electric product category, and a clothing category. When receiving the dialogue information of "I want to buy cold medicine", the server only needs to search the medicine category for a third party, so that a time for searching for a third party is further shortened, and the efficiency of connecting the third party is further improved.

Figure 7:
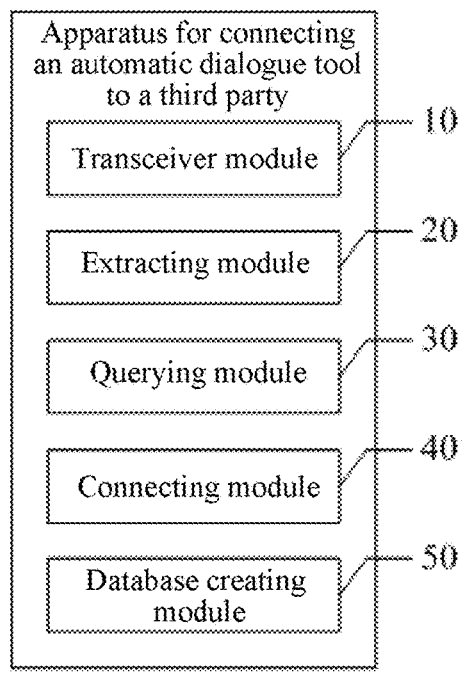
FIG. 7 is a schematic structural diagram of a second embodiment of an apparatus for connecting an automatic dialogue tool to a third party according to the present disclosure.

As shown in FIG. 7, FIG. 7 is a schematic structural diagram of a second embodiment of an apparatus for connecting an automatic dialogue tool to a third party according to the present disclosure. In this embodiment, based on the embodiment shown in FIG. 6, a database creating module 50 configured to create a third party database is added.

The database creating module 50 is configured to receive a registration request of the third party client, where the registration request carries third party information; and store the third party information in the third party database.

In this embodiment, when the third party database is created, a third party is allowed to register by using a client and submit information related to the third party during the registration, so as to prove that it is a third party. For example, a name, an involved range, and the like of the third party are clarified in an account name and a brief introduction, so as to be stored in the database by the server. In addition, the third party may also select a list to which the third party belongs, so as to be classified into a corresponding category in the database for subsequent searching. In addition, the server may also require the third party to upload related qualification documents, for example, an identity card, a business license, and a qualification license, so as to prevent some lawbreakers from entering the database in chaos to damage interests of the user, and ensure consultation safety and reliability of the user.

It should be noted that, in the specification, the terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Unless otherwise specified, an element limited by "include a/an . . . " does not exclude other same elements existing in the process, the method, the article, or the apparatus that includes the element.

The sequence numbers for the foregoing embodiments of the present disclosure are merely for the purpose of description only, and do not represent the superiority or inferiority of the embodiments.

Through the descriptions of the foregoing embodiments, a person skilled in the art may clearly understand that the method in the foregoing embodiments may be implemented by software plus necessary universal hardware, and certainly may also be implemented by hardware, but in most cases, the former is a better implementation manner in most cases. Based on such an understanding, the technical solutions of the present disclosure essentially, or the part contributing to the prior art may be implemented in a form of a software product. The computer software product may be stored in a storage medium (for example, a ROM/RAM, a magnetic disk, or an optical disc), and includes several instructions for instructing a terminal device (for example, a mobile phone, a computer, a server, or a network device) to perform the method in the embodiments of the present disclosure.

The foregoing descriptions are merely preferred embodiments of the present disclosure but are not intended to limit the patent scope of the present disclosure. Any equivalent modifications made to the structures or processes based on the content of the specification and the accompanying drawings of the present disclosure for direct or indirect use in other relevant technical fields shall also be encompassed in the patent protection scope of the present disclosure.

What is claimed is:

1. A computer-implemented method for connecting an automatic dialogue tool to a third party, comprising performing functions by a server, wherein the server having one or more processors and memory for storing one or more programs to be executed by the one or more processors to cause the server to perform the functions, comprising:
   providing a chat robot to engage in automatic dialogue with the user client within a chat environment;
   receiving information content comprising a query sent by a user client to the chat robot and extracting key information from the information content; and
   determining that the chat robot cannot answer the query;
   in response to determining that the chat robot cannot answer the query:
      querying a database comprising a record of a plurality of third party clients that are registered with the chat environment as third party clients capable of engaging in communication within the chat environment, the querying comprising querying for an identification of at least one third party client corresponding to the key information, wherein the querying further comprises determining that the at least one third party client is currently logged into the chat environment and omitting third party clients that are not currently logged into the chat environment;
      sending the identification of the at least one third party client to the user client;
      in response to sending the identification of the at least one third party client to the user client, receiving user selection information indicating a user selection of a selected third party client from the identification of the at least one third party client sent to the user client;
      sending an access request to the selected third party client selected by the user client in response to receiving the user selection information, wherein the access request comprises a request for the selected third party client to communicate with the user client within the chat environment; and
      establishing a communication connection within the chat environment between the user client and the selected third party client in response to receiving an access response fed back by the selected third party client in order to transpire a peer to peer live chat dialogue within the chat environment between the user client and the selected third party client to render a service request of the user client.

2. The method according to claim 1, further comprising: re-sending the identification of the at least one third party client to the user client in response to determining that the selected third party client fails to respond to receiving the access request after a time out time or in response to receiving access rejection information fed back by the third party client.

3. The method according to claim 1, wherein querying the database further comprises:
   querying for an identification of a registered user for the at least one third party client corresponding to the key information.

4. The method according to claim 2, wherein querying the database further comprises:
   querying for an identification of a registered user for the at least one third party client corresponding to the key information.

5. The method according to claim 1, wherein the database is created in the following manner:
   receiving a registration request of at least one third party client, wherein the registration request carries the identification of the at least one third party and information corresponding to the at least one third party; and
   storing the identification of the at least one third party and the information corresponding to the at least one third party in the database.

6. The method according to claim 1, wherein the third party client is operated by a human engaging in the peer to peer live chat dialogue within the chat environment.

7. An apparatus for connecting an automatic dialogue tool to a third party, comprising:
   one or more processors;

a memory; and one or more programs stored in the memory and to be executed by the one or more processors, the one or more programs configure the apparatus to perform operations, comprising:

providing a chat robot to engage in automatic dialogue with a user client within a chat environment;

causing a transceiver to receive information content comprising a query sent by the user client to the chat robot;

extracting key information from the information content; and determining that the chat robot cannot answer the query;

in response to determining that the chat robot cannot answer the query:

querying a database comprising a record of a plurality of third party clients that are registered with the chat environment as third party clients capable of engaging in communication within the chat environment, the querying comprising querying for an identification of at least one third party client corresponding to the key information, wherein the querying further comprises determining that the at least one third party client is currently logged into the chat environment and omitting third party clients that are not currently logged into the chat environment:

wherein the transceiver is further configured to send the identification of the at least one third party client to the user client, and, in response, receive user selection information indicating a user selection of a selected third party client from the identification of the at least one third party client sent to the user client;

send an access request to the selected third party client selected by the user client in response to receiving the user selection information, wherein the access request is a request for the third party client to communicate with the user client within the chat environment; and establish a communication connection within the chat environment between the user client and the selected third party client in response to receiving an access response fed back by the selected third party client in order to transpire a peer to peer live chat dialogue within the chat environment between the user client and the selected third party client to render a service request of the user client.

8. The apparatus according to claim 7, wherein the transceiver is further configured to re-send the identification of the ast least one third party client to the user client in response to determining that the selected third party client fails to respond to receiving the access request after a time out time or in response to receiving access rejection information fed back by the third party client.

9. The apparatus according to claim 7, wherein the apparatus is further configured to query the database for an identification of a registered user for the at least one third party client corresponding to the key information.

10. The apparatus according to claim 8, wherein the apparatus is further configured to query the database for an identification of a registered user for the at least one third party client corresponding to the key information.

11. The apparatus according to claim 7, wherein the apparatus is, configured to:

receive a registration request of at least one third party client, wherein the registration request carries the identification of the at least one third party and information corresponding to the at least one third party; and store the identification of the at least one third party and the information corresponding to the at least one third party in the database.

12. The apparatus according to claim 7, wherein the third party client is operated by a human engaging in the peer to peer live chat dialogue within the chat environment.

13. A non-transitory computer-readable storage medium having instructions stored thereon, the instructions, when executed by one or more processors in a machine, cause the processors in the machine to perform operations comprising:

providing a chat robot to engage in automatic dialogue with a user client within a chat environment;

receiving information content comprising a query sent by the user client to the chat robot and extracting key information from the information content; and determining that the chat robot cannot answer the query;

in response to determining that the chat robot cannot answer the query:

querying a database comprising a record of a plurality of third party clients that are registered with the chat environment as third party clients capable of engaging in communication within the chat environment, the querying comprising querying for an identification of at least one third party client corresponding to the key information, wherein the querying further comprises determining that the at least one third party client is currently logged into the chat environment and omitting third party clients that are not currently logged into the chat environment;

sending the identification of the at least one third party client to the user client;

in response to sending the identification of the at least one third party client to the user client, receiving user selection information indicating a a user selection of a selected third party client from the identification of the at least one third party client sent to the user client;

sending an access request to the selected third party client selected by the user client in response to receiving the user selection information, wherein the access request comprises a request for the selected third party client to communicate with the user client within the chat environment; and establishing a communication connection within the chat environment between the user client and the selected third party client in response to receiving an access response fed back by the selected third party client in order to transpire a peer to peer live chat dialogue within the chat environment between the user client and the selected third party client to render a service request of the user client.

14. The non-transitory computer readable storage medium of claim 13, wherein the operations further comprise:

re-sending the identification of the at least one third party client to the user client in response to determining that the selected third party client fails to respond to receiving the access request after a time out time or in response to receiving access rejection information fed back by the third party client.

15. The non-transitory computer readable storage medium of claim 13, wherein querying the database further comprises:

querying for an identification of a registered user for the at least one third party client corresponding to the key information.

16. The non-transitory computer readable storage medium of claim 13, wherein the database is created in the following manner:
   receiving a registration request of at least one third party client, wherein the registration request carries the identification of the at least one third party and information corresponding to the at least one third party; and
   storing the identification of the at least one third party and the information corresponding to the at least one third party in the database.

17. The non-transitory computer readable storage medium of claim 13, wherein the third party client is operated by a human engaging in the peer to peer live chat dialogue within the chat environment.

* * * * *